United States Patent [19]

Nos et al.

[11] Patent Number: 4,752,218
[45] Date of Patent: Jun. 21, 1988

[54] CERAMIC COMPOSITE MATERIAL AND A LINING FOR METALLURGICAL SMELTING FURNACES WHEREIN A CERAMIC COMPOSITE MATERIAL IS USED

[75] Inventors: Per Olav Nos, Hon; Otto Sonju, Trondheim, both of Norway

[73] Assignee: Elkem a/s, Norway

[21] Appl. No.: 908,572

[22] Filed: Sep. 18, 1986

[30] Foreign Application Priority Data

Oct. 9, 1985 [NO] Norway ................... 853994

[51] Int. Cl.$^4$ .............................. F27D 1/00
[52] U.S. Cl. .................... 432/247; 432/248; 110/336; 110/340
[58] Field of Search ............... 432/247, 248; 110/336, 110/340

[56] References Cited

U.S. PATENT DOCUMENTS

| | | |
|---|---|---|
| 1,440,218 | 11/1921 | French . |
| 3,554,517 | 1/1971 | Seacrest . |
| 3,940,244 | 2/1976 | Sander et al. ............. 432/247 |
| 3,993,433 | 11/1976 | Isaksson et al. ........... 432/247 |
| 4,325,694 | 4/1982 | Bergman ................... 432/247 |
| 4,582,742 | 4/1986 | Gilhart ...................... 428/119 |

FOREIGN PATENT DOCUMENTS

| | | |
|---|---|---|
| 0008261 | 2/1980 | European Pat. Off. . |
| 1944415 | 4/1971 | Fed. Rep. of Germany . |
| 1431102 | 11/1966 | France . |
| 2358626 | 10/1978 | France . |
| 1325057 | 8/1973 | United Kingdom . |
| 1453091 | 10/1976 | United Kingdom . |

OTHER PUBLICATIONS

838 American Ceramic Society Bulletin 63 (1984), Jul., No. 7, Columbus, Ohio, USA, C. H. Sump, "Improved Refractory Retention on Substrates".

*Primary Examiner*—Henry C. Yuen
*Attorney, Agent, or Firm*—Lucas & Just

[57] ABSTRACT

The present invention relates to a ceramic composite material having a high thermal conductivity. The ceramic composite material consists of a network of metal fibers embedded in a ceramic material and where the network of fibers on one side of the ceramic composite material extends out to the surface of ceramic composite material. A part of the metal fibers may be subtituted by ceramic fibers and/or carbon fibers.

Preferably, the area of the network of metal fibers occupies 60–95% of the total area of the surface wherein the network of metal fibers extends out to the surface of the ceramic composite material.

The present invention further relates to a refractory lining for metallurgical smelting furnace wherein at least a part of the above described ceramic composite material is connected by a metallic bond to a cooled metallic part of the smelting furnace.

5 Claims, 1 Drawing Sheet

CERAMIC COMPOSITE MATERIAL AND A LINING FOR METALLURGICAL SMELTING FURNACES WHEREIN A CERAMIC COMPOSITE MATERIAL IS USED

The present invention relates to a ceramic composite material and to a lining for metallurgical smelting furnace in which the ceramic composite material is used.

In furnaces for smelting of metals, refractory linings which are resistant against chemical wear from molten slag and metal has to be used in the parts of the furnaces which are in contact with molten slag and metal. Generally, the chemical reactivity of ceramic or refractory materials increases with increasing temperature.

If refractory materials having good thermal insulating properties are used as lining materials, these materials will soon be broken down due to high surface temperature.

In order to control and reduce the chemical wear of refractory linings it is, at least for the most vulnerable parts of the refractory linings, desireable to use ceramic materials having a relatively high thermal conductivity and to obtain a good thermal contact between the ceramic material and a cooled surface, such as for example a furnace shell. In this way the temperature in the ceramic material can be lowered and the chemical wear of the ceramic material which are in contact with molten metal or molten slag, will thereby be reduced.

It is an object of the present invention to provide a ceramic composite material having a high thermal conductivity and which can be connected to a metal surface in such a way that a very good thermal contact is obtained between the ceramic composite material and the metal surface.

Accordingly, the present invention relates to a ceramic composite material consisting of a network of metal fibers, where a part of the metal fibers may be substituted by ceramic fibers or carbon fibers, which network is embedded in a ceramic material and that the network of fibers at one side of the ceramic material extends out to the surface of the ceramic material.

By network of fibers is herein understood a structure of fibers which may be two-dimensional or three-dimensional. The main purpose of the network of fibers is to increase the thermal conductivity of the ceramic composite material in a given direction and to reduce the surface temperature of the ceramic composite material when it is exposed to high temperature.

According to a preferred embodiment of the present invention, the area of the network of metal fibers is 60-95% of the total area of the surface wherein the network of fibers extend out to the surface of the ceramic composite material. The fibers that are used in the network have preferably a diameter less than 1 mm.

The present invention further relates to a refractory lining for metallurgical smelting furnaces in which at least a part of the lining consists of a ceramic composite material comprising a network of metal fibers, wherein a part of the metal fibers may be replaced by ceramic or carbon fibers, which network of fibers is embedded in a ceramic material wherein the network of fibers at one side of the ceramic material extends out to the surface of the ceramic mateial and that the ceramic composite material is connected by a metallic bond to a cooled, metal part of the smelting furnace.

A preferred embodiment of the present invention will now be further described in connection with FIG. 1, which shows a ceramic composite material according to the present invention connected to a metal plate.

Figure 1:
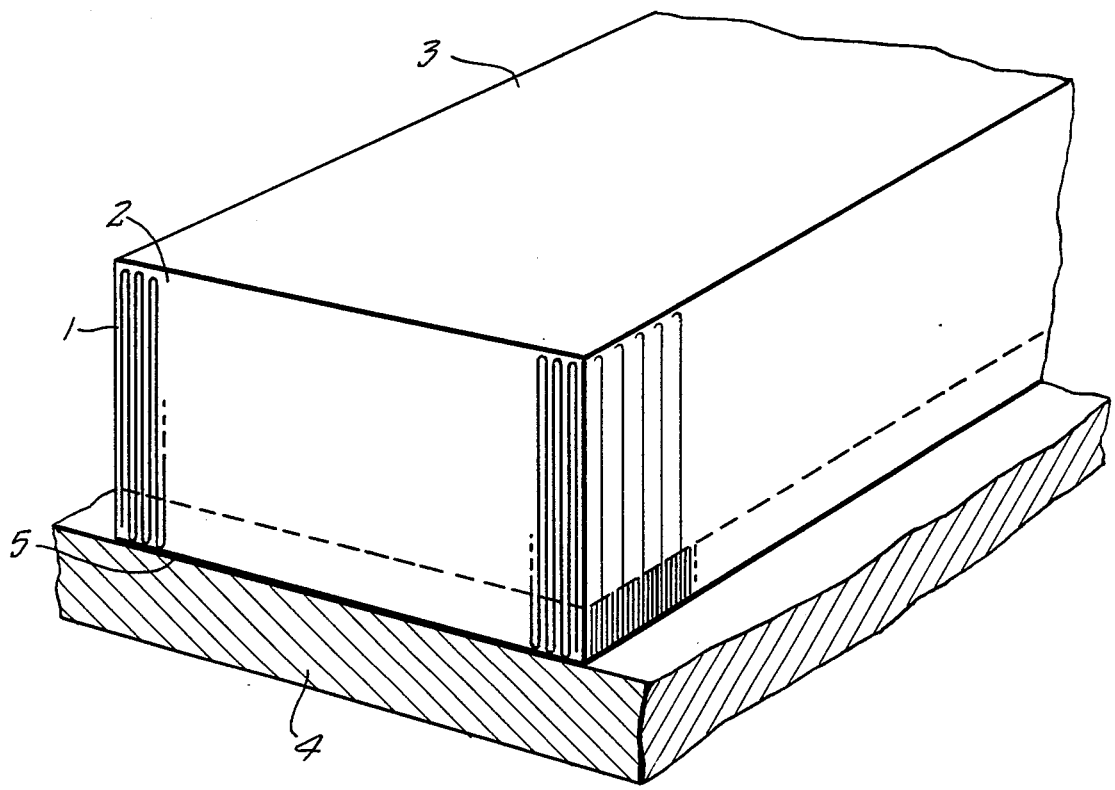
FIG. 1 illustrates a ceramic block according to the present invention.
Figure 1A:
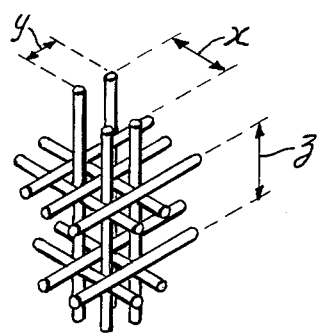
FIG. 1A illustrates a three dimensional network according to the present invention.

On FIG. 1 the reference numeral 1 shows a three-dimensional network of metal fibers embedded in a ceramic material 2. The metal fibers are made from a high temperature resistant metal or alloy and have preferably a diameter less than 1 mm. The metal fibers 1 are completely embedded in the ceramic material at the side 3 of the ceramic composite material 2 which are intended to be in contact with liquid metal or liquid slag while the network of metal fibers 1 extends out to the surface on the opposite side of the ceramic composite material 2, said fibers being intended to be connected to a metal surface.

As shown on FIG. 1, the ceramic composite material is connected to a metal plate 4 which may be a metal casing or another type of cooled metal part of a metallurgical smelting furnce. The ceramic composite material 2 is connected to the metal plate 4 by brazing or soldering as shown by 5. Thereby a very good thermal contact is obtained between the ceramic composite material 2 and the metal plate 4. By cooling of the metal plate 4, a high flow of heat is obtained from the ceramic composite material 2 to the metal plate 4.

In order to secure safe connection and good thermal contact between the ceramic composite material 2 and the metal plate 4, it is preferred that area of the network of metal fibers 1 in the lower surface of the ceramic composite material 2 is 60-95% of the total area of the surface.

By use of the ceramic composite material according to the present invention as refractory lining in the parts of a smelting furnace which are in contact with molten metal or slag, a very high flow of heat outwardly through the ceramic composite material is achieved by cooling the metal plate to which the ceramic material is connected. The surface temperature of the ceramic material is thereby substantially lowered and hence the chemical wear on the surface of the ceramic material will be reduced. The life time for the ceramic material will thereby be substantially increased.

The composition of the ceramic material is choosen in accordance with the condition under which the material is to be used and in principle any ceramic material can be used.

The ceramic composite material according to the present invention is preferably produced by first producing the network of metal fibers in the desired geometrical form and thereafter impregnating the network of metal fibers with ceramic material, for example by a hot pressure or vacuum method.

What is claimed is:

1. A ceramic block for lining an interior of a metallurgical smelting furnace having metal walls, said block having a high thermal conductivity, said block comprising:
  (a) a body of ceramic material;
  (b) said block having a first side, said first side facing the interior of said furnace, said first side consisting of ceramic material;

(c) said block having a second side, said second side facing the metal wall, said second side being opposite said first side; and (d) a network of conducting metal fibers embedded in said body of said block and extending from said first side to and through said second side, said fibers occupying about 60% to 95% of the total surface area of said second side such that said fibers can be connected to said metal wall of said furnace to conduct heat away from said block and to said metal wall.

2. The ceramic block for lining a furnace according to claim 1 wherein the fibers in the network have a diameter less than 1 mm.

3. The ceramic block for lining a furnace according to claim 1 wherein a portion of said metal fibers in said network is made up of ceramic fibers.

4. The ceramic block for lining a furnace according to claim 1 wherein a portion of said metal fibers in said network is made up of carbon fibers.

5. The ceramic block for lining a furnace according to claim 1 wherein a portion of said metal fibers in said network is made up of ceramic fibers and carbon fibers.

* * * * *